A. C. McWILLIAMS.
PANEL BOARD FOR ELECTRICAL POWER DISTRIBUTION.
APPLICATION FILED SEPT. 30, 1905.

920,490.

Patented May 4, 1909.

2 SHEETS—SHEET 1.

UNITED STATES PATENT OFFICE.

ARTHUR C. McWILLIAMS, OF CHICAGO, ILLINOIS.

PANEL-BOARD FOR ELECTRICAL-POWER DISTRIBUTION.

No. 920,490.  Specification of Letters Patent.  Patented May 4, 1909.

Application filed September 30, 1905. Serial No. 280,802.

*To all whom it may concern:*

Be it known that I, ARTHUR C. MCWILLIAMS, a citizen of the United States, residing at Chicago, in the county of Cook and State of Illinois, have invented a certain new and useful Improvement in Panel-Boards for Electrical-Power Distribution, of which the following is a specification.

My invention relates to systems of electrical power distribution and panel boards for use in connection therewith.

The object of the invention is to facilitate the interchanging of the consumption circuits with the meter circuits so that any consumption circuit may be readily connected to any meter and as many consumption circuits as desired may be readily connected to any one meter.

Figure 1:
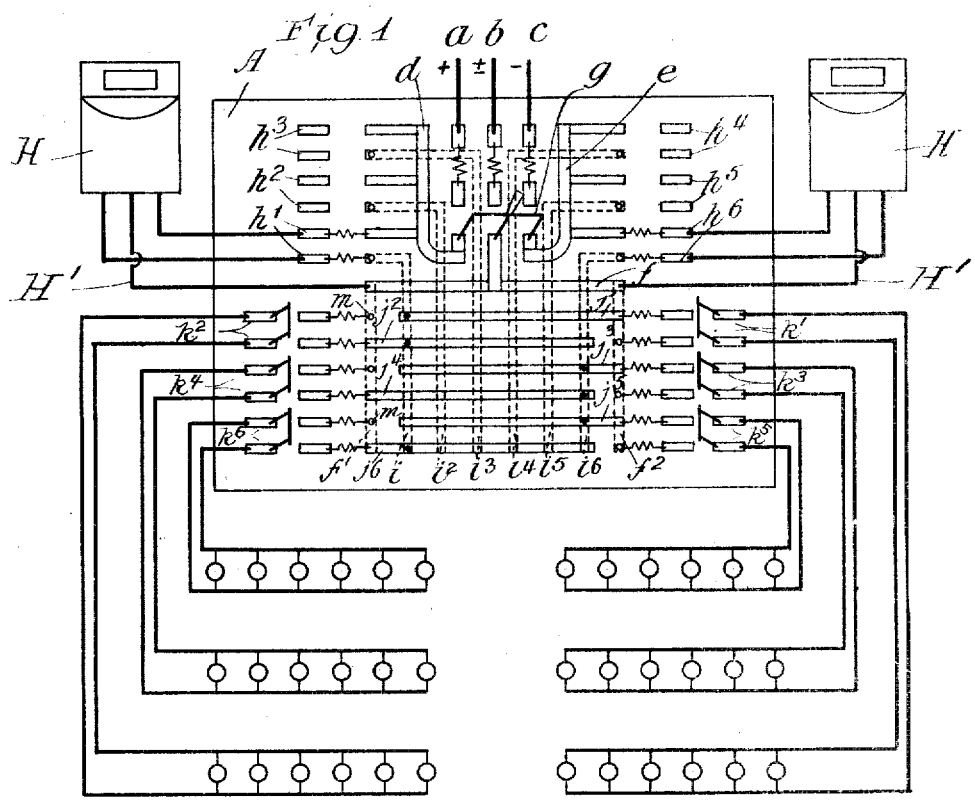
Figure 2:
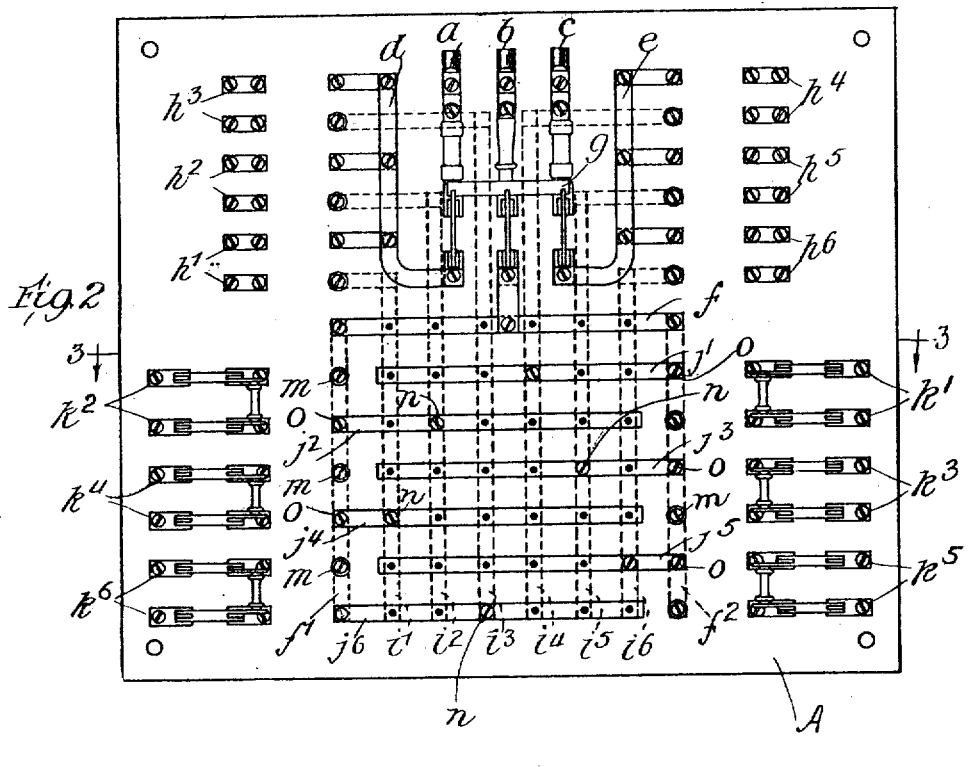
Figure 3:
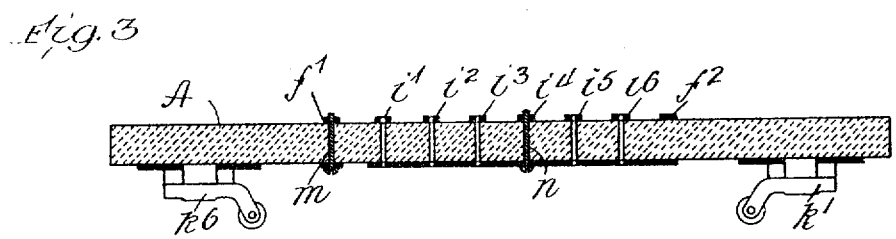

It is also an object to provide a compact, economical metering panel board usable in connection with such a system. This object is obtained by the apparatus illustrated in the accompanying drawings in which:

Figure 1 is a diagrammatic view of the apparatus and circuits. Fig. 2 is a front view of a panel board embodying the invention, and Fig. 3 is a transverse sectional view of the board, on the line 3—3 Fig. 2.

Similar letters refer to similar parts throughout the several views.

The apparatus here illustrated is arranged for a three wire system although the invention is equally applicable to a two wire system. The supply mains $a$, $b$, $c$, which are respectively positive, neutral and negative are adapted to be connected respectively to the positive, neutral and negative bus-bars $d$, $f$, $e$, through the switch $g$ in the ordinary manner.

The parts are mounted on the board A which may consist of marble or any other suitable insulating material. In the drawings are shown six pairs of meter circuit terminals $h^1$, $h^2$, $h^3$, $h^4$, $h^5$ and $h^6$ each one of which is adapted to have a meter H connected thereto. One of each pair of said terminals is connected to a main, the remaining terminal being connected respectively to one of the stationary conductors $i^1$, $i^2$, $i^3$, $i^4$, $i^5$, $i^6$ which in the present design are mounted on the back of board A, and arranged vertically. A third wire $H^1$ is shown to be connected from the neutral bus bar $f$ to the meter H to furnish a shunt current for operating them in the customary manner.

Arranged transversely to the meter circuit conductors $i^1$, $i^2$, $i^3$, $i^4$, $i^5$, $i^6$ are the consumption conductors $j^1$, $j^2$, $j^3$, $j^4$, $j^5$ and $j^6$ which in the present design are mounted horizontally on the front side of board A. Each of these last mentioned conductors mounted on the front of the board is arranged to be fuse-connected to the adjacent terminal of a consumption circuit by means of a shallow binding screw $o$ or other suitable device, which does not penetrate into the board or to the bars $f^1$ or $f^2$ behind, but merely holds the fuse in contact with conductors $j^1$, $j^2$ etc. Said consumption circuits may include lamps, as shown, or any other kind of load. Said bars $f^1$ and $f^2$ are permanently mounted on the board, preferably on the back thereof, and by means of the plugs or screws $m$ which penetrate the board, are adapted to be fuse-connected to the remaining terminals of the pairs of consumption circuit terminals $k^1$, $k^2$, $k^3$, $k^4$, $k^5$ and $k^6$. Thus in each pair of consumption circuit terminals one is connected by a penetrating plug $m$ to one of the mains, (the neutral one in this instance) while the remaining terminal is adapted to be permanently fuse-connected by means of a binding screw $o$ to one of the set of permanent consumption circuit conductors $j^1$, $j^2$, $j^3$, $j^4$, $j^5$ or $j^6$. By the word "permanent" is meant such parts as are intended to be part of the apparatus itself in distinction to the wiring or other parts that are intended to be altered to suit requirements for rearrangement of metering. In consequence of the above, in each meter circuit in this three wire design one terminal of each pair of meter terminals is connected to either the positive or negative supply main and the other terminal is connected to its respective conductor $i^1$ or $i^2$ etc.; while in each consumption circuit one terminal is connected to the neutral supply main and the other terminal is connected to one of the conductors $j^1$ or $j^2$ etc. Each one of the meter conductors, $i^1$, $i^2$ etc., crosses each one of the consumption conductors $j^1$, $j^2$ etc., and therefore in order to complete the circuit through a meter and a consumption circuit it is only necessary to connect one of the conductors $i^1$, or $i^2$ etc., with a conductor $j^1$ or $j^2$ etc. In the present case, provision is made for this by aperturing the board A at the different crossing points to receive plugs or screws $n$, $n$, as best shown in Fig. 3.

In operation, suppose it is desired to throw consumption circuit $k^2$ onto the meter circuit $h^1$, it is merely necessary to put in a plug or screw $n$ at the intersection of conductors $i^2$ and $j^2$ as shown, among other combinations, in Fig. 2. If it is desired to substitute consumption circuit $k^4$ this may be done by removing the aforesaid plug and placing it at the intersection of conductors $i^2$ and $j^4$. All consumption circuits may be connected to meter circuit $h^2$ if desired by putting in a plug at each of the intersections of conductor $i^2$ with the conductors $j^1$, $j^2$, $j^3$, $j^4$, $j^5$, and $j^6$. In a similar manner any consumption circuit may be readily connected to any meter, and as many consumption circuits as desired may be connected to any one meter. It will be noted that no change of wiring of any kind is required, the entire operation consisting in simply inserting or removing one or more plugs as the case may be. This feature is of great advantage in many types of power distribution, for example in the lighting of office buildings where the tenants have their individual meters and where on account of frequent rearrangements of office space frequent rearrangement is required in the metering of the light circuits.

This invention is equally applicable to two wire systems and to power systems having a large number of consumption and meter circuits. The specific arrangement here shown may be considerably varied without departing from the spirit of the invention, for example, it is not essential that the consumption and meter circuit conductors be on opposite sides of the board nor cross at right angles to each other. Nor is it essential that the consumption circuits be permanently connected to the neutral supply terminal as it is immaterial whether the current flowing from positive to neutral first pass through the meter or the consumption circuits.

By referring to the drawings it will be noted that one set of conductor bars is arranged alternately so that one bar leads to a terminal at one edge of the board while the next adjacent bar leads to a terminal at the opposite edge of the board. It will also be noted that in the preferred form these terminals include fuses and switches. The advantage in this alternate arrangement is that it affords double the area for the terminal connections for any given length of board and consequently shortens the vertical conductor bars, and the board itself. Terminals consisting of switches are considerably wider than the conductor bars, and an ordinary board, to accommodate them, has to be much longer than it would have to be to accommodate merely the horizontal conductor bars; furthermore the vertical bars have to be very long to enable them to cross all of the horizontal bars. By my arrangement in which the terminal connections are grouped symmetrically on two sides of the vertical bars and the horizontal bars are led to them alternately, first on one side and then on the other, the vertical bars are just about half as long as they would be if grouped all on one side of the board.

What I claim as new and desire to secure by Letters Patent, is:

1. A metering panel board having crossed permanent conductors, the conductors running one way being for the meter circuits and those running across them being for the consumption circuits, said conductors being adapted to be electrically connected at their points of crossing, one set of conductors being arranged alternately so that one conductor leads toward one edge of the board for connection to its circuit while the conductors on either side thereof lead toward the opposite edge of the board for connection to their circuits.

2. A metering panel board having parallel horizontal bars and parallel vertical bars crossing the horizontal ones, one set of said bars being for the meter circuits and the other set for the consumption circuits, said bars being adapted to be electrically connected at their points of crossing, the horizontal bars being connected at their outer ends to their proper circuit terminals and alternating with each other so that the connected end of one horizontal bar is nearest to one vertical edge of the board and the connected end of the next adjacent horizontal bar is nearest to the opposite vertical edge of the board.

3. A metering panel board having switches arranged along the vertical edges of the board, a conductor bar running horizontally inward from each of said switches and being arranged alternately so that one bar is associated with a switch at one edge of the board and the adjacent bar is associated with a switch at the opposite edge of the board, and another set of bars arranged at an angle to the first and having proper terminal connections, one of said sets of bars being for the consumption circuits and the other set for the meter circuits, said bars being adapted for electrical connection at their intersections.

4. A metering panel board having two sets of parallel conductors arranged at an angle to each other in different planes and adapted to be electrically connected at their points of intersection, one set of bars being associated with the consumption circuits and the other set with the meter circuits, the consumption circuit bars being provided with switches and arranged alternately so that the switch for one consumption bar comes at one edge of the board while the switch for the adjacent consumption bar comes at the other edge of the board thereby affording greater area for the mounting of the consumption circuit switches.

5. A metering panel board having parallel conductors adapted for electrical connection to the consumption circuits, said parallel conductors being arranged alternately so that one conductor leads toward one edge of the board while the adjacent conductor leads toward the opposite edge of the board, and other conductors adapted for electrical connection to the meter circuits, said meter conductors being parallel to each other and arranged in a plane parallel to the plane of the consumption conductors, said conductors being adapted for electrical contact at their intersections substantially in the manner and for the purpose described.

6. A system of electrical power distribution including consumption circuits extending from districts of consumption to a panel board, bus bars on said board connected to said consumption circuits, meter circuits, other bus bars on said board connected to said meter circuits, means for interchangeably connecting the bus bars associated with the consumption circuits with the bus bars belonging to the meter circuits, one of said sets of bus bars being provided with terminals arranged along the two edges of the board, and connected to their bars alternately, substantially as described.

7. A system of electrical power distribution including consumption circuits extending from districts of consumption to a panel board, bus bars on said board connected to said consumption circuits, meter circuits, other bus bars on said board connected to said meter circuits, means for interchangeably connecting the bus bars associated with the consumption circuits with the bus bars belonging to the meter circuits, terminal switches for the consumption circuits arranged along the two vertical edges of the board, half of said switches being arranged at one side and half at the other side and connected alternately to their bus bars for the purpose described.

8. A system of electrical power distribution including consumption circuits extending from districts of consumption to a panel board, bus bars on said board connected to said consumption circuits, meter circuits, other bus bars on said board angularly disposed with respect to the first bars, and connected to said meter circuits, the bus bars being apertured at their intersections, plugs for insertion within said apertures for interchangeably connecting the bus bars associated with the consumption circuits with the bus bars belonging to the meter circuits, terminals for one set of bars arranged along the opposite edges of the board, and connected to the bars alternately substantially as described.

9. A panel board having fuses arranged along the vertical edges of the board, a conductor bar running horizontally inward from each of said fuses and being arranged alternately so that one bar is associated with a fuse at one edge of the board and the adjacent bar is associated with a fuse at the opposite edge of the board, and another set of bars arranged at an angle to the first and having proper terminal connections, one of said sets of bars being for the consumption circuits and the other set for the meter circuits, said bars being adapted for electrical connection at their intersections.

10. In a metering panel board, a set of meter circuit conductors and a set of consumption circuit conductors, the bars of one set being arranged at an angle to the bars of the other set and said bars being adapted to be interchangeably connected at their points of intersection, one set of bars being provided with terminals so arranged that adjacent bars are associated with terminals on opposite sides of the board.

In witness whereof, I have hereunto subscribed my name in the presence of two witnesses.

ARTHUR C. McWILLIAMS.

Witnesses:
HOWARD M. COX,
DWIGHT B. CHEEVER.